United States Patent
Xuan

(10) Patent No.: US 6,299,429 B1
(45) Date of Patent: *Oct. 9, 2001

(54) DUAL FIBER OPTIC LASER TEXTURING

(75) Inventor: Jialuo Jack Xuan, Milpitas, CA (US)

(73) Assignee: Seagate Technology LLC, Scotts Valley, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/058,859

(22) Filed: Apr. 13, 1998

Related U.S. Application Data

(62) Division of application No. 08/919,601, filed on Aug. 28, 1997, now Pat. No. 5,837,330.

(51) Int. Cl.$^7$ .................................................. G11B 5/84
(52) U.S. Cl. .................. 425/174.4; 65/286; 219/121.68; 219/121.77; 264/400; 425/385; 425/810
(58) Field of Search ................... 264/1.27, 400, 264/482; 425/174.4, 385, 810; 219/121.68, 121.75, 121.77; 65/106, 286, 392, 441

(56) References Cited

U.S. PATENT DOCUMENTS

| | | |
|---|---|---|
| 3,674,340 | 7/1972 | Jacob . |
| 3,764,218 | 10/1973 | Schedewie . |
| 3,938,878 | 2/1976 | Fox . |
| 4,060,306 | 11/1977 | Swaminathan . |
| 4,139,263 | 2/1979 | Lehureau et al. . |
| 4,675,872 * | 6/1987 | Popek et al. ............................ 372/10 |
| 4,733,047 * | 3/1988 | Cruickshank et al. ........... 219/121.77 |
| 4,937,421 * | 6/1990 | Ortiz, Jr. et al. ................ 219/121.77 |
| 5,056,886 * | 10/1991 | Hoult ..................................... 385/20 |
| 5,062,021 | 10/1991 | Ranjan et al. . |
| 5,128,914 | 7/1992 | Kurata et al. . |
| 5,166,006 | 11/1992 | Lal et al. . |
| 5,202,810 | 4/1993 | Nakamura et al. . |
| 5,273,834 | 12/1993 | Hoover et al. . |
| 5,275,168 * | 1/1994 | Reintjes et al. ...................... 128/665 |
| 5,391,522 | 2/1995 | Goto et al. . |
| 5,402,407 | 3/1995 | Eguchi et al. . |
| 5,416,755 | 5/1995 | Endo et al. . |
| 5,528,922 * | 6/1996 | Baumgart et al. ..................... 29/557 |
| 5,586,040 * | 12/1996 | Baumgart et al. ............. 364/474.08 |
| 5,595,768 * | 1/1997 | Treves et al. ..................... 425/174.4 |
| 5,595,791 * | 1/1997 | Baumgart et al. ................... 427/554 |

(List continued on next page.)

FOREIGN PATENT DOCUMENTS 0 652 554   5/1995   (EP) .

OTHER PUBLICATIONS

Cunningham, Richard, "Delivering Nd:YAG Laser Beams The Easy Way", Lasers & Optronics, pp. 59–64, Sep. 1990.*
Baumgart et al., "A New Laser Texturing Technique for High Performance Magnetic Disk Drives", IEEE Transactions on Magnetics, vol. 31, No. 6, pp. 2946–2951, Nov. 1995.
Kuo et al., "Laser Zone texturing on Glass and Glass–Ceramic Substrates", presented at the Magnetic Recording Conference (TMRC), Santa Clara, California, Aug. 19–21, 1996.

*Primary Examiner*—James P. Mackey
(74) *Attorney, Agent, or Firm*—McDermott, Will & Emery

(57) ABSTRACT

The substrate of a magnetic recording medium is laser textured employing a dual fiber-optic laser delivery system which enables separate control of nucleation and crystallization. An embodiment of the invention includes laser texturing glass, ceramic and glass-ceramic substrates without microcracking to form a texture comprising uniform protrusions.

7 Claims, 3 Drawing Sheets

U.S. PATENT DOCUMENTS

| | | | | |
|---|---|---|---|---|
| 5,606,165 | * | 2/1997 | Chiou et al. | 250/363.06 |
| 5,616,261 | * | 4/1997 | Forrest | 219/121.77 |
| 5,714,207 | * | 2/1998 | Kuo | 427/555 |
| 5,730,528 | * | 3/1998 | Allison et al. | 374/161 |
| 5,759,419 | * | 6/1998 | Mochida et al. | 216/22 |
| 5,768,076 | * | 6/1998 | Baumgart et al. | 360/135 |
| 5,783,797 | * | 7/1998 | Xuan et al. | 264/400 |
| 5,830,514 | * | 11/1998 | Barenboim et al. | 425/174.4 |
| 5,863,473 | * | 1/1999 | Ohsawa et al. | 264/400 |
| 5,939,709 | * | 8/1999 | Ghislain et al. | 250/216 |
| 6,005,663 | * | 12/1999 | Waterhouse et al. | 356/344 |

* cited by examiner

DUAL FIBER OPTIC LASER TEXTURING

This application is a division of U.S. Ser. No. 08/919,601 filed Aug. 28, 1997, now U.S. Pat. No. 5,837,330 which issued on Nov. 17, 1998.

TECHNICAL FIELD

The present invention relates generally to texturing a magnetic recording medium. The present invention is particularly applicable to texturing a high density recording magnetic recording medium substrate comprising a glass, ceramic or glass-ceramic material.

BACKGROUND ART

Conventional magnetic disk drive designs comprise a commonly denominated Contact Start-Stop (CSS) system commencing when the head begins to slide against the surface of the disk as the disk begins to rotate. Upon reaching a predetermined high rotational speed, the head floats in air at a predetermined distance from the surface of the disk due to dynamic pressure effects caused by air flow generated between the sliding surface of the head and the disk. During reading and recording operations, the transducer head is maintained at a controlled distance from the recording surface, supported on a bearing of air as the disk rotates, such that the head can be freely moved in both the circumferential and radial directions allowing data to be recorded on and retrieved from the surface of the disk at a desired position. Upon terminating operation of the disk drive, the rotational speed of the disk decreases and the head again begins to slide against the surface of the disk and eventually stops in contact with and pressing against the disk. Thus, the transducer head contacts the recording surface whenever the disk is stationary, accelerated from the stop and during deceleration just prior to completely stopping. Each time the head and disk assembly is driven, the sliding surface of the head repeats the cyclic operation consisting of stopping, sliding against the surface of the disk, floating in the air, sliding against the surface of the disk and stopping.

It is considered desirable during reading and recording operations to maintain each transducer head as close to its associated recording surface as possible, i.e., to minimize the flying height of the head. Thus, a smooth recording surface is preferred, as well as a smooth opposing surface of the associated transducer head, thereby permitting the head and the disk to be positioned in close proximity with an attendant increase in predictability and consistent behavior of the air bearing supporting the head. However, if the head surface and the recording surface are too flat, the precision match of these surfaces gives rise to excessive stiction and friction during the start up and stopping phases, thereby causing wear to the head and recording surfaces eventually leading to what is referred to as a "head crash." Thus, there are competing goals of reduced head/disk friction and minimum transducer flying height.

Conventional practices for addressing these apparent competing objectives involve providing a magnetic disk with a roughened recording surface to reduce the head/disk friction by techniques generally referred to as "texturing." Conventional texturing techniques involve polishing the surface of a disk substrate to provide a texture thereon prior to subsequent deposition of layers, such as an underlayer, a magnetic layer, a protective overcoat, and a lubricant topcoat, wherein the textured surface on the substrate is intended to be substantially replicated in the subsequently deposited layers.

The escalating requirements for high areal recording density impose increasingly greater requirements on thin film magnetic media in terms of coercivity, stiction, squareness, low medium noise and narrow track recording performance. In addition, increasingly high density and large-capacity magnetic disks require increasingly smaller flying heights, i.e., the distance by which the head floats above the surface of the disk in the CSS drive. The requirement to further reduce the flying height of the head renders it particularly difficult to satisfy the requirements for controlled texturing to avoid head crash.

Conventional techniques for providing a disk substrate with a textured surface comprise a mechanical operation, such as polishing. See, for example, Nakamura et al., U.S. Pat. No. 5,202,810. Conventional mechanical texturing techniques are attendant with numerous disadvantages. For example, it is extremely difficult to provide a clean textured surface due to debris formed by mechanical abrasions. Moreover, the surface inevitably becomes scratched during mechanical operations, which contributes to poor glide characteristics and higher defects. In addition, various desirable substrates are difficult to process by mechanical texturing. This undesirably limiting facet of mechanical texturing, virtually excludes the use of many materials for use as substrates.

An alternative texturing technique to mechanical texturing comprises the use of a laser light beam focused on an upper surface of a non-magnetic substrate. See, for example, Ranjan et al., U.S. Pat. No. 5,062,021, wherein the disclosed method comprises polishing an NiP plated Al substrate to a specular finish, and then rotating the disk while directing pulsed laser energy over a limited portion of the radius, to provide a textured landing zone leaving the data zone specular. The landing zone comprises a plurality of individual laser spots characterized by a central depression surrounded by a substantially circular raised rim.

Another laser texturing technique is reported by Baumgart et al. "A New Laser Texturing Technique for High Performance Magnetic Disk Drives," IEEE Transactions on Magnetics, Vol. 31, No. 6, pp. 2946–2951, November 1995.

U.S. Pat. No. 5,714,207 which issued on Feb. 3, 1998, a laser texturing technique is disclosed employing a multiple lens focusing system for improved control of the resulting topographical texture. In U.S. Pat. No. 5,783,797 which issued on Jul. 21, 1998, a laser texturing technique is disclosed wherein a pulsed, focused laser light beam is passed through a crystal material to control the spacing between resulting protrusions.

Conventional laser texturing techniques have previously been applied to metal-containing substrates or substrates having a metal-containing surface, such as Ni—P plated Al or Al-base alloys. Such substrates, however, exhibit a tendency toward corrosion and are relatively deformable, thereby limiting their utility so that they are not particularly desirable for use in mobile computer data storage applications, such as laptop computers. Glass and glass-ceramic substrates exhibit superior resistance to shock than Ni—P coated Al or Al-alloy substrates. Accordingly, glass, ceramic and glass-ceramic substrates are desirable candidates for use in mobile computer data storage applications. However, it is extremely difficult to provide an adequate texture on a glass, ceramic or glass-ceramic substrate, particularly in view of the escalating requirements for high areal recording density.

Conventional practices for texturing a glass or glass-ceramic substrate comprise heat treatment. Goto et al., U.S.

Pat. No. 5,391,522, discloses a glass-ceramic substrate suitable for use in a magnetic recording medium. A textured surface is provided by heat treatment, during which the recrystallization temperature is maintained for about 1 to about 5 hours to generate secondary crystal grains forming the surface texture characterized by irregular protrusions with surrounding valleys extending into substrate.

Hoover et al., U.S. Pat. No. 5,273,834 discloses the use of alternate substrates, such as glass-ceramic substrates. The substrate material is provided with ions for absorbing radiation in the near infrared portion of the spectrum, thereby rendering the material capable of attaining elevated temperatures during film deposition.

The use of heat treatment to form a textured surface on alternate substrates, such as glass or glass-ceramic substrates, is undesirably slow and inefficient in terms of energy consumption. Significantly, it is extremely difficult to exercise control over the size and shape of the secondary crystal grains due to inherent limitations in controlling temperature uniformity. Accordingly, it is virtually impossible to provide a glass or glass-ceramic substrate with a controlled textured landing zone for optimizing flying height and maximizing data zone recording density. Moreover, the resulting texture comprises irregularly shaped protrusions with surrounding valleys extending into the substrate, thereby creating undesirable stress profiles during subsequent deposition of layers by sputtering at elevated temperatures. Such undesirable stress profiles render it extremely difficult to accurately replicate the texture in subsequently deposited layers.

In copending PCT application Serial No. PCT/US96/06830, a method is disclosed for laser texturing a glass or glass-ceramic substrate employing a laser light beam derived from a $CO_2$ laser source. The textured glass or glass-ceramic substrate surface comprises a plurality of protrusions which extend above the substrate surface, without surrounding valleys extending substantially into the substrate as is characteristic of a laser textured metallic substrate. The effect of laser parameters, such as pulse width, spot size and pulse energy, and substrate composition on the protrusion or bump height of a laser textured glass or glass-ceramic substrate is reported by Kuo et al., in an article entitle "Laser Zone Texturing on Glass and Glass-Ceramic Substrates," presented at The Magnetic Recording Conference (TMRC), Santa Clara, Calif., Aug. 19–21, 1996.

It is recognized that laser texturing of alternate substrates such as glass, ceramic and glass-ceramic materials, is attendant upon several problems, notably microcracking. EPA 0652554 A1 addresses such a microcracking problem by controlling the radiant energy fluence during laser texturing so that it is less than the thermal shock threshold for the particular material undergoing laser texturing.

In U.S. Pat. No. 5,714,207 which issued on Feb. 3, 1998, a method is disclosed for laser texturing a glass or glass-ceramic substrate, wherein the height of the protrusions is controlled by controlling the quench rate during resolidification of the laser formed protrusions. One of the disclosed techniques for controlling the quench rate comprises preheating a substrate, as by exposure to a first laser light beam, and then exposing the heated substrate to a focused laser light beam.

There is a continuing need in the magnetic recording media industry for an efficient method and apparatus for uniformly texturing the substrate of a magnetic recording medium to obtain a controllable pattern of protrusions. There also exists a need for an efficient method and apparatus for laser texturing a glass, ceramic or glass-ceramic substrate of a magnetic recording medium to obtain controllable textures without causing microcracking of the substrate material.

DISCLOSURE OF THE INVENTION

An object of the present invention is a method and apparatus for texturing a substrate to provide a controllable pattern of protrusions thereon.

Another object of the present invention is a method and apparatus for laser texturing a glass, ceramic or glass-ceramic substrate in a controlled manner to avoid microcracking.

Additional objects, advantages and other features of the invention will be set forth in each description which follows and in part will become apparent to those having ordinary skill in the art upon examination of the following or may be learned from the practice of the invention. The objects and advantages of the invention may be realized and obtained as particularly pointed out in the appended claims.

According to the present invention, the foregoing and other objects are achieved in part by a method of manufacturing a magnetic recording medium, which method comprises: exposing a first surface of a substrate to a pulsed laser light beam through a first lens to form a first focused laser light beam spot on the first surface having a first diameter and to heat the first surface to a first temperature; and exposing the first surface to a pulsed laser light beam through a second lens to form a second focused laser light beam spot overlapping at least a portion of the first spot and having a second diameter less than the first diameter and to heat the first surface to a second temperature greater than the first temperature, thereby texturing the first surface by forming a plurality of protrusions thereon extending above the first surface.

Another aspect of the present invention is an apparatus for laser texturing a magnetic recording medium by forming a plurality of protrusions on a first surface, which apparatus comprises: a laser light beam source; a first fiber optic cable having a first end optically linked to the laser light beam and a second end optically linked to a first lens; and a second fiber optic cable having a first end optically linked to the laser light beam source and a second end optically linked to a second lens, wherein the laser light beam passing through the first lens forms a spot on the first surface having a diameter greater than the diameter of a spot formed on the first surface by the laser light beam passing through the second lens.

Additional objects and advantages of the present invention will become readily apparent to those skilled in this art from the following detailed description, wherein embodiments of the invention are described, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

The present invention comprises laser texturing a magnetic recording medium, to form topographical protrusions having a controlled height, diameter and spacing. The present invention avoids subjecting a substrate, particularly a glass, ceramic or glass-ceramic substrate, to thermal shock by exposing the substrate to a first laser light beam spot to elevate the substrate to a first temperature proximate the nucleation temperature of the substrate material. After such preconditioning, the substrate is exposed to a second laser light beam spot, smaller than the first spot, elevating the substrate to a second temperature higher than the first temperature, which second temperature is proximate the crystallization temperature of the substrate material. Thus, in accordance with the present invention, the nucleation and crystallization growth rate of a particular substrate material are separately controlled by varying the laser power and mechanical movement of the substrate which is typically rotated during laser exposure.

Figure 1:
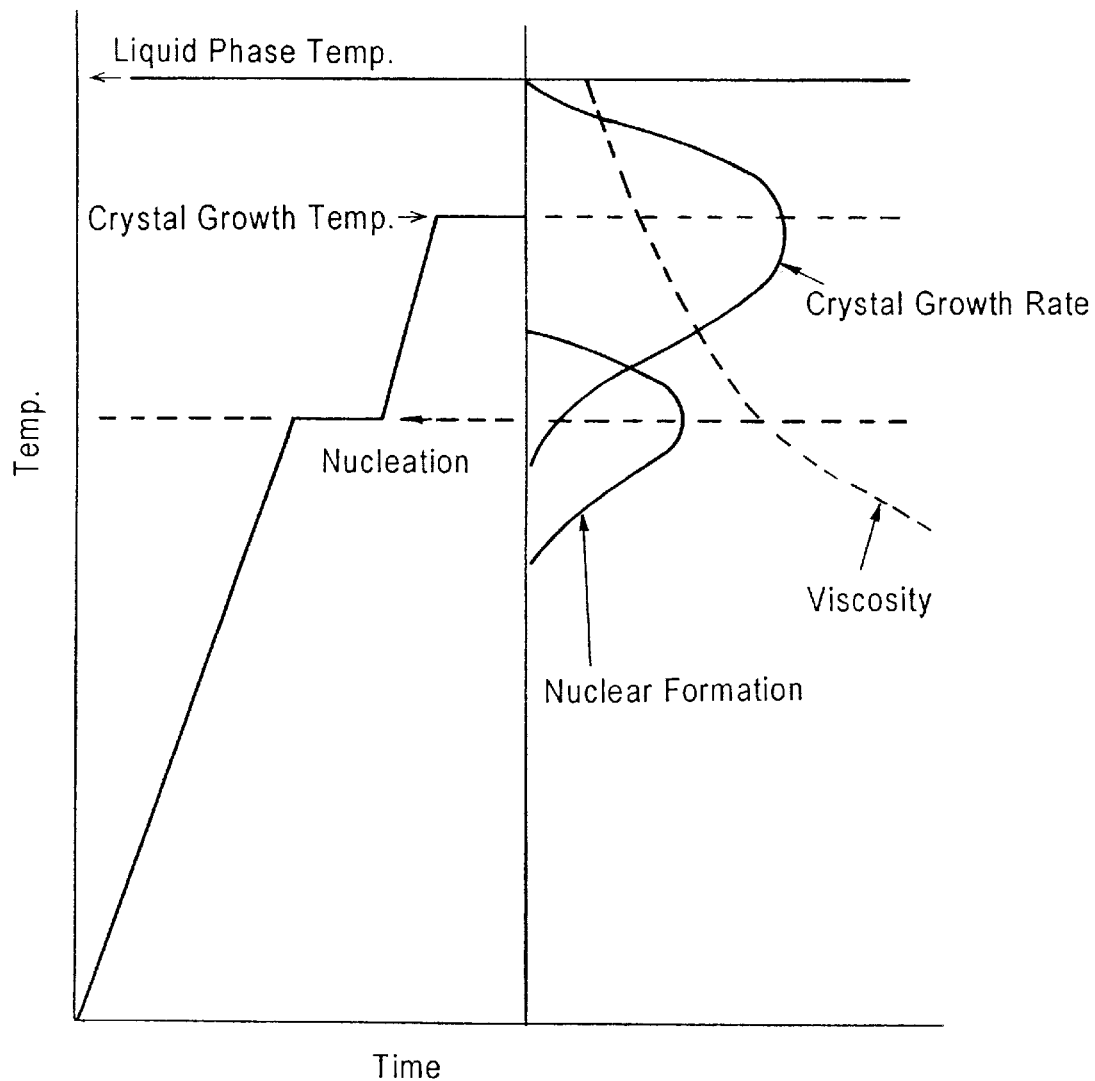
FIG. 1 is a graph illustrating nucleation and crystallization for a glass-ceramic surface as a function of temperature and time.

The present invention stems from an appreciation of the mechanism by which bumps or protrusions are formed during laser texturing a substrate. Adverting to FIG. 1, it is apparent that nucleation initiates after a certain period of time at a first temperature followed by crystal growth, i.e., crystallization, at a second temperature higher than the first temperature. As one having ordinary skill in the art would recognize, the time and temperature for nucleation and crystallization will vary for different materials. Accordingly, particular times and temperatures have not been indicated in FIG. 1.

In appreciation of the mechanism involved in nucleation and growth of glass, ceramic and glass-ceramic materials, a laser texturing system of the present invention comprises two fiber optical cables and two microfocusing lenses. The first microfocusing lens is optically linked to a laser light beam source directly or indirectly via a first fiber optic cable. Such optically linkages are conventional and, hence, not discussed herein in detail. As one having ordinary skill in the art would appreciate, a laser light beam can be split into two sub-beams each of which can be optically linked to a fiber optic cable which in turn can be optically linked to a microfocus lens.

In accordance with the present invention, the first and second lenses can be optically linked to first and second fiber optic cables through a single linkage housing. One having ordinary skill in the art could easily select microfocus lenses having an appropriate focal length to implement the present invention. For example, it has been found suitable to provide a first microfocus lens having a focal length 2 mm greater than that of the second lens. Typically, the first microfocus lens has a focal length of about 5 mm to about 10 mm; and the second microfocus lens has a focal length of about 3 mm to about 8 mm. A first surface of the substrate is exposed to a pulsed laser light beam through the first microfocus lens to form a spot thereon having a first diameter. The first substrate is then exposed to a pulsed laser light beam through the second microfocus lens to form a spot having a second diameter smaller than the first diameter. Typically, the first spot has a diameter of about 10 $\mu$m to about 30 $\mu$m; while the second spot has a diameter of about 5 $\mu$m to about 10 $\mu$m. The first spot is formed so as to at least partially overlap the second spot, and optimally entirely within the second spot.

The first laser light beam spot elevates the first surface of the substrate to a first temperature, while the second laser light beam elevates the substrate surface to a second temperature greater than that of the first temperature. The first temperature is proximate the nucleation temperature for the particular substrate material undergoing laser texturing, while the second temperature is at about the crystallization temperature or crystal growth temperature of the substrate material. In this way, the crystallization time and temperature can be adjustably and precisely controlled to achieve microtopographical protrusions or bumps exhibiting a high degree of uniformity while avoiding thermal shock to the substrate and, hence, substrate microcracking. One having ordinary skill in the art could easily optimize the laser pulse energy, pulse width and pulse rate to achieve the objectives of the present invention for a particular material. For example, the laser light beam passed through the first microfocusing lens can be suitably pulsed at a frequency of about 1 to about 20$\mu$ seconds, while the laser light beam passed through the second microfocusing lens can be suitably pulsed at a frequency of about 0.5 to about 3$\mu$ seconds. One having ordinary skill in the art, given the objectives of the present invention, could easily optimize the first and second temperatures dependent upon a particular substrate material. For example, the first temperature can range from about 300° C. to about 700° C., while the second temperature can range from about 600° C. to about 1400° C., but not above the melting temperature of the particular substrate material.

The present invention not only provides a uniform topography and avoids microcracking, but is rapid and, hence, increases production throughput. Moreover, the dual fiber optic laser delivery system of the present invention employing two microfocusing lenses provides improved uniformity and repeatable textures vis-à-vis conventional laser texturing techniques.

An apparatus in accordance with the present invention can advantageously comprise components employed in conventional laser texturing systems, such as those disclosed in EPA Application Serial No. 0652554 A1, U.S. Pat. No. 5,714,207 which issued on Feb. 3, 1998, U.S. Pat. No. 5,783,797 which was filed on Jul. 21, 1998; and copending Application Serial No. PCT/US96/06830, the disclosures of which are incorporated herein by reference in their entirety.

As one having ordinary skill in the art would recognize, conventional practices comprise texturing and depositing a plurality of layers on opposite surfaces of a substrate in manufacturing a magnetic recording medium. Laser texturing of one surface of a substrate of a magnetic recording medium in accordance with the present invention is discussed for convenience, it being understood that opposite surfaces of the substrate are laser textured in manufacturing of a magnetic recording medium in accordance with the present invention.

Given the fundamental concepts underpinning the present invention employing two microfocusing lenses to heat a substrate at different temperatures to optimize nucleation and crystallization, one having ordinary skill in the art could easily control the relevant process parameters to obtain a desired topographical structure with respect to protrusion height, diameter, curvature and protrusion density to meet the glide and CSS performance for match slider surface designs. For example, in accordance with the present invention, the laser power and mechanical movement of the substrate are controlled, thereby enabling control of the secondary crystal grains and, hence, control of the position of the protrusions, height, curvature and density. Thus, one having ordinary skill in the art could easily optimize the relevant process parameters, such as the rotational speed of the substrate, pulse duration, power/pulse and repetition rate, to control the resulting texture. For example, the substrate can be rotated at a rate of about 200 rpm to about 1500 rpm, and the substrate can be exposed to a $CO_2$ laser light beam through the first microfocus lens for a pulse duration of about 1 to about $20\mu$ seconds, and to a $CO_2$ laser light beam through the second microfocus lens for a pulse duration of about 10 to about $40\mu$ seconds. The power/pulse of the laser light beam through the first microfocus lens can range from about 10 microjoules ($\mu j$) to about 05 $\mu j$, at a repetition rate (pulse/second) of about 500 to about 2000. The power/pulse of the laser light beam passing through the second microfocus lens can be about 20 $\mu j$ to about 40 $\mu j$, at a repetition rate (pulse/second) of about 500 to about 3000. Other relevant parameters to control bump height, such as pulse width, pulse energy and spot size, could be optimized by one having ordinary skill in the art consistent with the Kuo et al., publication "Laser Zone Texturing on Glass and Glass-Ceramic Substrates," previously mentioned.

Figure 2:
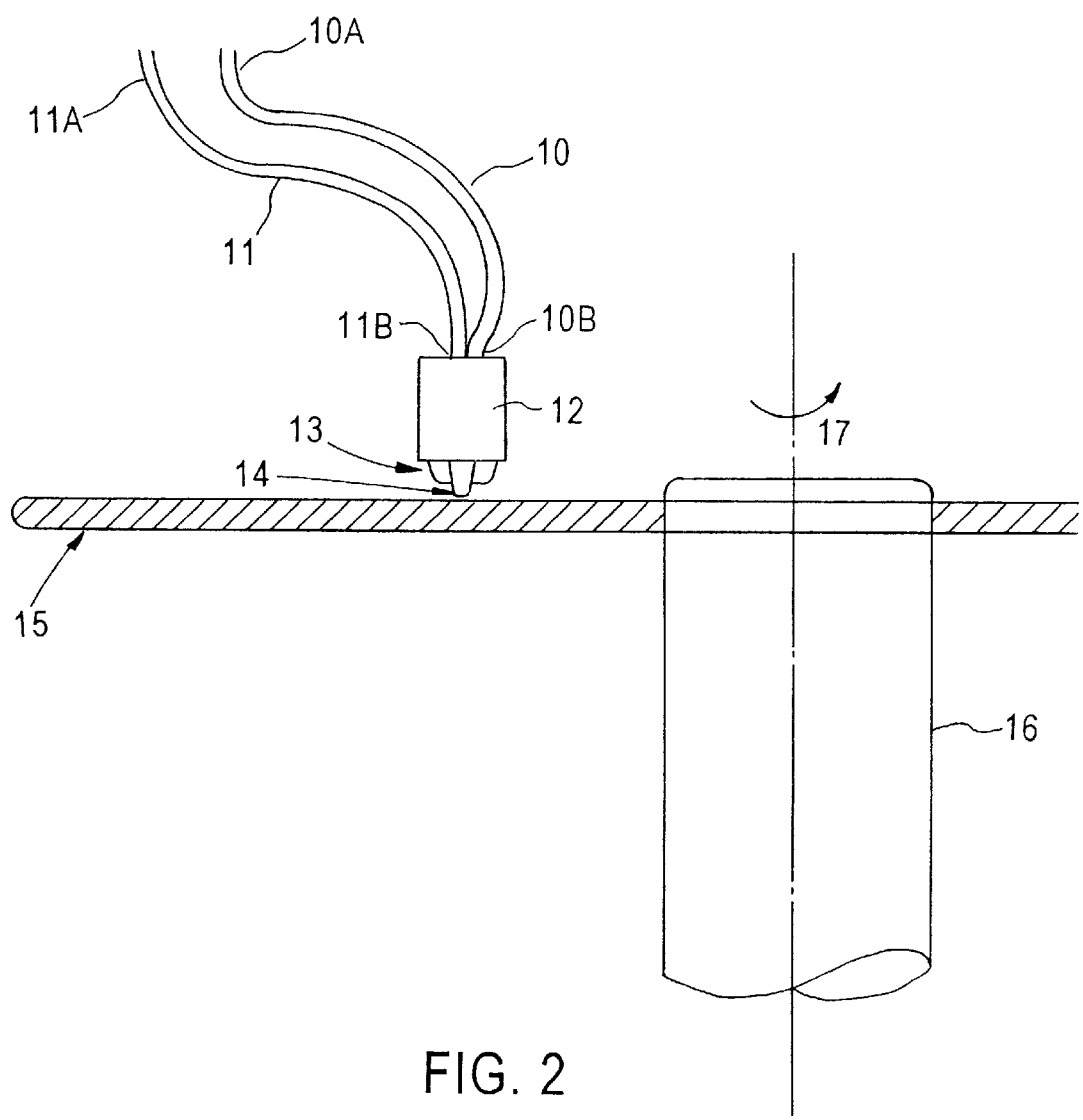
FIG. 2 schematically illustrates a portion of a dual fiber optic laser delivery apparatus in accordance with an embodiment of the present invention.

An embodiment of the present invention is illustrated in FIG. 2 and comprises first fiber optic cable 10 having a first end 10A optically linked to a laser light beam source (not shown) and a second end 10B optically linked to a first microfocusing lens 13. Second fiber optic cable 11 comprises a first end 11A optically linked to the laser light beam source (not shown) and a second end 11B optically linked to a second microfocusing lens 14. Conveniently, optical linkage of the first and second fiber optic cables to the lenses can be effected through a single optical linkage housing 12. Substrate 15, e.g., a glass-ceramic disk, is mounted on a spindle 16 which is rotated in the direction of arrow 17 during laser texturing.

Figure 3:
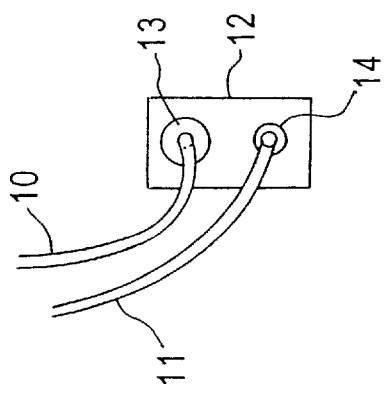
FIG. 3 schematically illustrates a dual fiber optic cable linkage to a multiple focusing lens system in accordance with an embodiment of the present invention.

FIG. 3 is an expanded view of the optical linkage of the optical fiber cable 10 to first microfocus lens 13 and of the optical linkage between fiber optical cable 11 to second microfocus lens 14 via optical fiber linkage housing 12.

Figure 4:
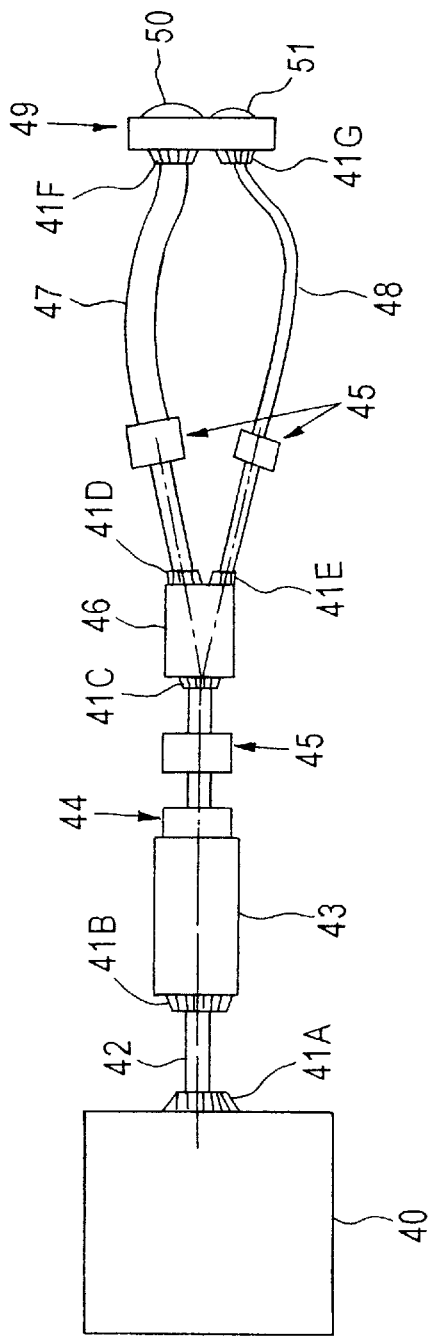
FIG. 4 schematically illustrates a dual fiber optic laser texturing apparatus in accordance with an embodiment of the present invention.

A dual fiber optic laser texturing apparatus in accordance with an embodiment of the present invention is schematically illustrated in FIG. 4 and comprises laser controller 40 connected to laser head 43 having shuttle isolator 44 affixed thereto. The schematically depicted apparatus further comprises attenuators 45, laser fiber coupling 46, first and second optical fiber cables 47, 48, respectively, which optical fiber cables are optically linked to the dual fiber optic assembly 49 comprising first and second microfocusing lenses 50, 51, respectively. Microfocusing lens 50 has a focal length 2 mm greater than microfocusing lens 51 and forms a laser beam spot on a targeted substrate which is greater than the laser light beam spot formed by microfocusing lens 51. Reference numerals 41A through 41G represent optic-fiber coupling connectors, while reference numeral 42 represents optic-fiber cables.

As one having ordinary skill in the art would recognize, after texturing the substrate in accordance with the present invention, conventional layers are deposited on both sides of the substrate to completing the magnetic recording medium. For example, various conventional magnetic recording media comprise sequentially sputter deposited layers, such as an underlayer, magnetic alloy layer and protective overcoat. A lubricant topcoat is also conventionally applied to the protective topcoat.

In practicing the present invention, conventional and commercially available glass, ceramic and glass-ceramic substrates can be employed, such as OHARA, Hoya and Nippon glass. The substrate is initially polished to provide a specular surface and a landing zone accurately formed thereon by the inventive laser texturing technique, leaving a specular data zone with maximized areal recording density.

The magnetic layers deposited in accordance with the present invention can be any of those conventionally employed in the production of magnetic recording media. Such conventional magnetic alloys, include, but are not limited to, cobalt (Co) alloys, such as Co-base alloys, e.g., cobalt-chromium (CoCr), cobalt-samarium (CoSm), cobalt-chromium-tantalum (CoCrTa), cobalt-nickel-chromium (CoNiCr), cobalt-chromium-samarium (CoCrSm), cobalt-chromium-platinum-tantalum (CoCrPtTa), cobalt-chromium-platinum (CoCrPt), cobalt-nickel-platinum (CoNiPt), cobalt-nickel-chromium-platinum (CoNiCrPt) and cobalt-chromium-platinum-boron (CoCrPtB). The thickness of the magnetic layer is consistent with conventional practices and manufacturing a magnetic recording medium. Cobalt-base alloys having a thickness of about 100 Å to about 1000 Å, such as 200 Å to about 500 Å, has been found suitable.

As in conventional practices, an underlayer can be deposited on the textured substrate prior to depositing the magnetic layer. The underlayer can comprise chromium or a chromium-alloy, such as chromium-vanadium or chromium-titanium, oxygen-doped chromium, tungsten or a tungsten alloy.

In addition, a protective overcoat, such as a carbon overcoat, can be deposited on the magnetic layer, and a lubricant topcoat deposited on the protective overcoat. The underlayer, magnetic layers and protective overcoat can be applied in a conventional manner, by any of various sputtering techniques, deposited in conventional thicknesses employed in production of magnetic recording media.

The present invention advantageously enables accurate control of the height of laser formed protrusions, thereby optimizing tribologic and magnetic recordance compatible with the escalating requirements for high areal density and mobile computer data storage applications, such as laptop computers. The present invention advantageously increases production throughput while avoiding thermal shock and microcracking of various substrate materials, such as glass, ceramic and glass-ceramic materials. Moreover, the laser textures produced in accordance with the present invention are uniform and repeatable from substrate to substrate and substantially and accurately reproduced on subsequently deposited layers in manufacturing a magnetic recording medium.

The present invention can be employed to produce any of various types of magnetic recording media, including thin film disks, with an attendant improvement in flying stability, glide performance and head medium interface reliability. Moreover, the precise manner in which a landing zone is laser textured in accordance with the present invention enables increased areal recording density and a reduction in the size of head sliders.

Only the preferred embodiment of the invention and but a few examples of its versatility are shown and described in the present invention. It is to be understood that the invention is capable of use in various other combinations and environments and is capable of changes or modifications within the scope of the inventive concept as expressed herein.

What is claimed is:

1. An apparatus for laser texturing a magnetic recording medium by forming a plurality of protrusions on a first surface of a substrate, which apparatus comprises:

a laser light beam source;

a first fiber optic cable having a first end optically linked to the laser light beam source and a second end optionally linked to a first lens;

a second fiber optic cable having a first end optically linked to the laser light beam source and a second end optically linked to a second lens, wherein the laser light beam passing through the first lens forms a first spot on the first surface having a diameter greater than the diameter of a second spot formed on the first surface by the laser light beam passing through the second lens and the first spot at least partially overlaps the second spot; and means for rotating the substrate during laser texturing.

2. The apparatus according to claim 1, further comprising an RF power supply linked to the laser light beam source for varying the pulse energy of the laser light beam.

3. The apparatus according to claim 2, wherein:

the first lens is a microfocusing lens having a focal length of about 5 mm to about 10 mm; and the second lens is a microfocusing lens having a focal length of about 3 mm to about 8 mm.

4. The apparatus according to claim 3, wherein the first and second lenses are optically linked to the first and second fiber optic cables, respectively, through a single coupling housing.

5. The apparatus according to claim 1 wherein the laser light beam source is a $CO_2$ laser light source.

6. The apparatus according to claim 1, wherein the means for rotating the substrate during laser texturing comprises a spindle.

7. The apparatus according to claim 1, comprising:

third and fourth fiber optic cables optically linking the laser light beam source to a third lens, substantially the same as the first lens, and to a fourth lens, substantially the same as the second lens, respectively, for laser texturing a second surface opposite the first surface of the substrate.

* * * * *